US011596029B2

(12) United States Patent
Nishikoori et al.

(10) Patent No.: US 11,596,029 B2
(45) Date of Patent: Feb. 28, 2023

(54) INDUCTION HEATING APPARATUS

(71) Applicant: Samsung Electronics Co., Ltd., Suwon-si (KR)

(72) Inventors: Nobuharu Nishikoori, Yokohama (JP); Masayuki Otawara, Yokohama (JP); Tomoyuki Kanagawa, Yokohama (JP); Masashi Sasagawa, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 16/713,125

(22) Filed: Dec. 13, 2019

(65) Prior Publication Data

US 2020/0196400 A1 Jun. 18, 2020

(30) Foreign Application Priority Data

Dec. 13, 2018 (JP) .............................. JP2018-233326
Oct. 10, 2019 (KR) ......................... 10-2019-0125194

(51) Int. Cl.
*H05B 6/06* (2006.01)
*H05B 6/36* (2006.01)
(Continued)

(52) U.S. Cl.
CPC ........... *H05B 6/065* (2013.01); *H05B 1/0202* (2013.01); *H05B 6/1272* (2013.01); *H05B 6/365* (2013.01); *H05B 6/44* (2013.01)

(58) Field of Classification Search
CPC . H05B 6/04; H05B 6/06; H05B 6/062; H05B 6/065; H05B 6/08; H05B 6/12;
(Continued)

(56) References Cited

U.S. PATENT DOCUMENTS 3,275,784 A 9/1966 Merrett
3,704,357 A * 11/1972 Moulin .................... H01F 5/00
219/671
(Continued)

FOREIGN PATENT DOCUMENTS

EP 2512205 A1 10/2012
JP 2004-319296 A 11/2004
(Continued)

OTHER PUBLICATIONS

Supplementary European Search Report dated Oct. 22, 2021, in connection with European Application No. 19895374.7, 9 pages.
(Continued)

*Primary Examiner* — Hung D Nguyen

(57) ABSTRACT

An induction heating apparatus including an inverter comprising a switching element, the inverter configured to supply a power to a first node based on an operation of the switching element; a first heating coil around which a wire is wound in a first winding direction with respect to the first node and configured to be heated by the power supplied from the first node; a second heating coil around which a wire is wound in a second winding direction different from the first winding direction with respect to the first node and configured to be heated by the power supplied from the first node; and at least one processor configured to control a resonance frequency of a current flowing through the first heating coil and the second heating coil.

19 Claims, 16 Drawing Sheets

(51) Int. Cl.
*H05B 6/12* (2006.01)
*H05B 1/02* (2006.01)
*H05B 6/44* (2006.01)

(58) Field of Classification Search
CPC .. H05B 6/1209; H05B 6/1236; H05B 6/1245; H05B 6/1254; H05B 6/1263; H05B 6/1272; H05B 6/1281; H05B 6/14; H05B 6/365; H05B 6/44; H05B 1/0202; Y02B 40/00; Y02B 40/126
USPC ....... 219/620, 621, 622, 624, 626, 660, 661, 219/662, 663–665, 671, 672, 675, 676
See application file for complete search history.

(56) References Cited

U.S. PATENT DOCUMENTS

| | | | |
|---|---|---|---|
| 3,786,222 A * | 1/1974 | Hamden, Jr. ............ | H05B 6/06 219/675 |
| 2006/0118550 A1 | 6/2006 | de Rooij et al. | |
| 2007/0230987 A1 | 10/2007 | Yamashita | |
| 2012/0097664 A1* | 4/2012 | Kataoka ............... | H05B 6/1263 219/632 |
| 2012/0261405 A1 | 10/2012 | Kurose et al. | |
| 2018/0063891 A1 | 3/2018 | Imai et al. | |

FOREIGN PATENT DOCUMENTS

| | | |
|---|---|---|
| JP | 3843528 B2 | 11/2006 |
| JP | 2008-282609 A | 11/2008 |
| JP | 2010-055760 A | 3/2010 |
| JP | 2010-232196 A | 10/2010 |
| JP | 2011-258339 A | 12/2011 |
| JP | 4939867 B2 | 5/2012 |
| JP | 5026826 B2 | 9/2012 |
| JP | 2016-039644 A | 3/2016 |
| JP | 2018-032619 A | 3/2018 |
| JP | 2018-116794 A | 7/2018 |
| KR | 10-2018-0098118 A | 9/2018 |
| WO | 2007015651 A1 | 2/2007 |
| WO | 2011070785 A1 | 6/2011 |

OTHER PUBLICATIONS

International Search Report dated Apr. 10, 2020 in connection with International Patent Application No. PCT/KR2019/017499, 3 pages.

* cited by examiner

INDUCTION HEATING APPARATUS

CROSS-REFERENCE TO RELATED APPLICATIONS

This application is based on and claims priority under 35 U.S.C. 119 to Korean Patent Application No. 10-2019-0125194, filed on Oct. 10, 2019, in the Korean Intellectual Property Office, which claims the benefit of Japanese Patent Application No. 2018-233326 filed on Dec. 13, 2018, in the Japan Patent Office, the disclosures of which are herein incorporated by reference in their entireties

BACKGROUND

1. Field

The disclosure relates to an induction heating apparatus using a heating coil.

2. Description of Related Art

Patent document 1 discloses an induction heating apparatus that is provided with an inverter using a resonant circuit and that is configured to heat a nonmagnetic pot such as a pot made of an aluminum material. The resonant circuit of the inverter disclosed in patent document 1 includes a first resonant circuit in which a resonant capacitor is in series with a heating coil, a second resonant circuit provided with a second resonant capacitor in parallel with the first resonant circuit, and a resonant choke coil in series with the second resonant circuit.

Patent document 2 discloses an induction heating apparatus provided with an inverter circuit configured to output an alternating current signal by on/off operation of a plurality of switching elements, a controller configured to control the operation of the plurality of switching elements, and a plurality of resonant circuits having a heating coil and a resonant capacitor for induction heating an object to be heated.

RELATED ART DOCUMENT

[Patent Document 1]
Japanese Patent Laid-Open No. 2018-32619
[Patent Document 2]
International Publication No. 2011-70785

SUMMARY

However, in the technique of Patent document 1, because a relatively large current, which is equivalent to the current flowing through the heating coil, flows through the second resonant capacitor constituting the second resonant circuit, a loss occurs in the second resonant capacitor. Further, in order to reduce the current which flows through the switching element of the inverter, it is required to flow some amount of current to the resonant choke coil, and thus a loss occurs in the resonance choke coil.

In addition, in the technique of Patent document 2, when a large electric current flows through the heating coil, it may lead to a difficulty in that a large electric current, which is equivalent to the electric current flowing through the heating coil, flows through the inverter.

Therefore, it is an aspect of the disclosure to provide an induction heating apparatus, in which a heating coil is provided, capable of improving heating efficiency.

Additional aspects of the disclosure will be set forth in part in the description which follows and, in part, will be obvious from the description, or may be learned by practice of the disclosure.

In accordance with an aspect of the disclosure, an induction heating apparatus includes an inverter including a switching element, and configured to supply a power to a first node based on an operation of the switching element, a first heating coil configured to be heated by the power supplied from the first node and around which a wire is wound in a first winding direction with respect to the first node, a second heating coil configured to be heated by the power supplied from the first node and around which a wire is wound in a second winding direction different from the first winding direction, with respect to the first node, and at least one processor configured to control a resonance frequency of a current flowing through the first heating coil and the second heating coil.

The first heating coil may further include a first resonant circuit with which a first capacitor is connected in series, and the second heating coil may be connected in parallel with the first resonant circuit.

A closed loop circuit may be formed by connecting the first heating coil, the second heating coil, and the first capacitor in series with each other.

The first node may include an intermediate point connected to one end of the first heating coil and one end of the second heating coil or configured to allow the first heating coil and the second heating coil to be divided from each other.

The number of winding of the first heating coil may be greater than the number of winding of the second heating coil.

The at least one processor may control the inverter based on an absolute impedance value of the first resonant circuit and an absolute impedance value of the second heating coil.

The first heating coil may further include a first resonant circuit with which a first capacitor is connected in series, and the second heating coil may further include a second resonant circuit with which a second capacitor is connected in series. The first resonant circuit and the second resonant circuit may be connected in parallel with each other.

The at least one processor may control the inverter based on an absolute impedance value of the first resonant circuit and an absolute impedance value of the second resonant circuit.

A magnetic flux direction generated in the first heating coil may coincide with a magnetic flux direction generated in the second heating coil.

The first heating coil may be arranged in a ring shape, and the second heating coil may be provided on the inner side of the first heating coil.

An inductor may be connected to the first node.

The induction heating apparatus may further include a first switch provided between the first node and the first heating coil, a second switch provided between the second node and the first capacitor, and a third switch provided between the first node and the first capacitor.

The at least one processor may turn off the first switch and the second switch, and the at least one processor may connect the first resonant circuit to the second heating coil in series.

The at least one processor may identify the type of an object to be heated, based on a value of current flowing through the first resonant circuit and the second heating connected in series according to the resonance frequency.

The at least one processor may identify a material of the object to be heated based on the current value and a predetermined threshold value.

When the material of the object to be heated is non-magnetic, the at least one processor may turn on the first switch and the second switch and turn off the third switch to connect the first resonant circuit to the second heating coil in parallel with each other.

The at least one processor may control the inverter based on a value of a current flowing between the second node and the inverter and a predetermined minimum current value.

The at least one processor may change a frequency of the switch element to allow a difference between the absolute impedance value of the first resonant circuit and the absolute impedance value of the second heating coil to be included in a predetermined range.

The at least one processor may pre-store an impedance of an output circuit of the inverter, and control the inverter to allow the current value to be included in the predetermined stored impedance.

Before undertaking the DETAILED DESCRIPTION below, it may be advantageous to set forth definitions of certain words and phrases used throughout this patent document: the terms "include" and "comprise," as well as derivatives thereof, mean inclusion without limitation the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rentable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter embodiments of the disclosure will be described with reference to the drawings. A description of the following embodiments is merely exemplary in nature and is not intended to limit the disclosure, its application or its use.

Figure 1:
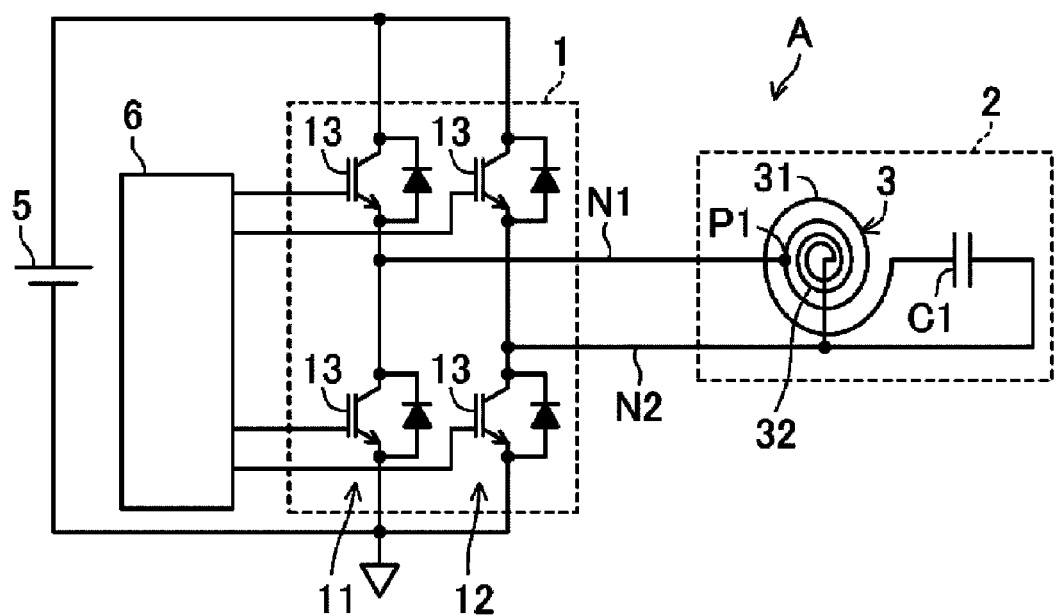
FIG. 1 is a circuit diagram illustrating an example of a configuration of an induction heating apparatus according to a first embodiment of the disclosure.
Figure 2:
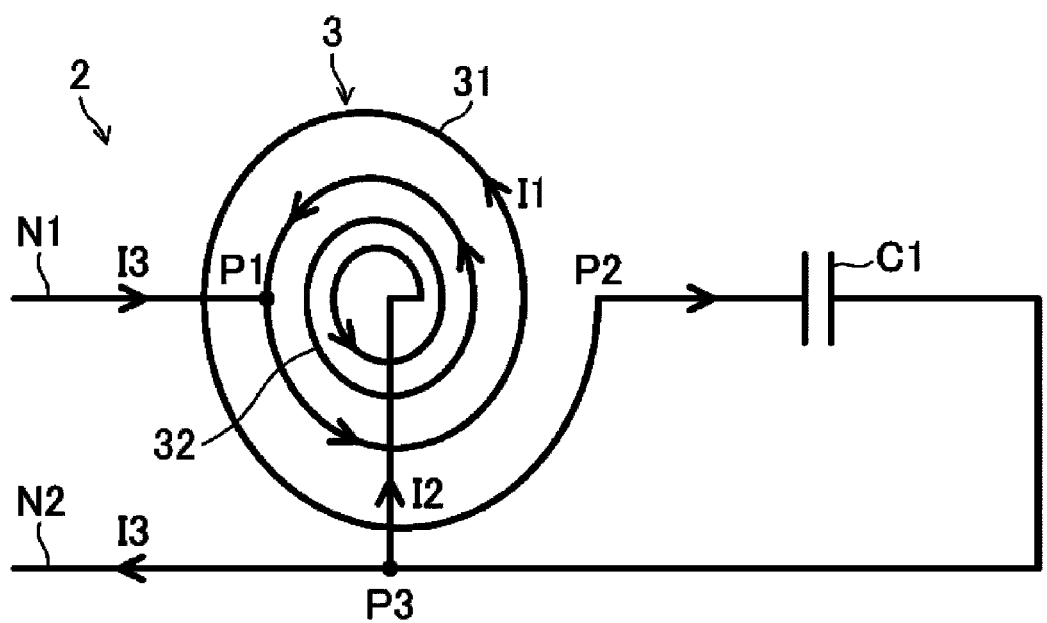
FIG. 2 is an enlarged view illustrating a current flow in a resonant circuit of FIG. 1 in use.
Figure 3:
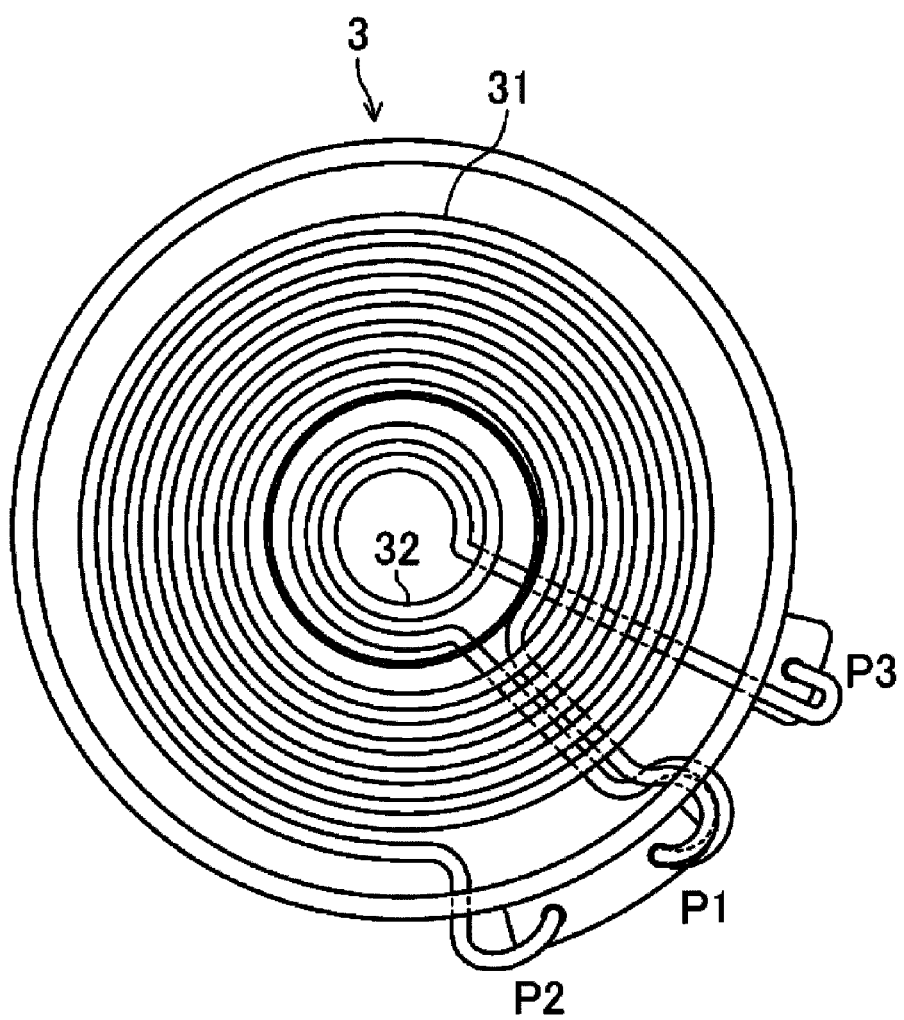
FIG. 3 is a plan view illustrating an example of a configuration of a heating coil.

FIG. 1 is a circuit diagram illustrating an example of a configuration of an induction heating apparatus A according to an embodiment of the disclosure, FIG. 2 is an enlarged view illustrating a current flow in a resonant circuit 2 when the induction heating apparatus is operated, and FIG. 3 is a plan view illustrating an example of a configuration of a heating coil.

As illustrated in FIG. 1, the induction heating apparatus A includes an inverter 1 configured to convert a direct current (DC) power received from a DC power source 5 into an alternating current (AC) power and configured to output the AC power, the resonant circuit 2 provided with a heating coil 3 for a heating function by receiving the power from the inverter 1, and a controller 6.

A circuit configuration of the inverter 1 is not particularly limited, and a conventionally known configuration may be applied. For example, FIG. 1 illustrates an example of the inverter 1 of the bridge structure in which two pairs of arms 11 and 12 are connected in parallel with each other. In FIG. 1, two switching elements 13 are connected in series with the two pairs of arms 11 and 12, respectively. In addition, each switching element 13 is a parallel circuit of a transistor and a diode connected in parallel or in a reverse direction to the transistor. Therefore, in the inverter 1, because each switching element 13 performs a switching operation under the control of the controller 6, the DC power is converted into AC power and the AC power is output. In the following description, a connection node between the two switching elements 13 of one arm 11 is referred to as a first node N1, and a connection node between the two switching elements 13 of the other arm 12 is referred to as a second node N2.

The controller 6 may be provided as at least one processor. Although the processor is represented by a single block in FIG. 1, the controller 6 may be provided as a chip implemented by a plurality of processors and additionally provided with a memory, as needed.

As illustrated in FIGS. 2 and 3, the heating coil 3 is wound in a spiral towards a predetermined one direction, and an intermediate point P1 positioned in the middle thereof is connected to the first node N1. That is, the heating coil 3 is divided into a first heating coil 31 and a second heating coil 32 by the intermediate point P1. The winding directions of wires of the first heating coil 31 and the second heating coil 32 are different from each other with respect to the first node N1.

The first heating coil 31 corresponds to a ring shaped coil, and the second heating coil 32 is arranged inside the first heating coil 31. In FIG. 3, P2 indicates an end portion (connection point with a first capacitor C1) of an opposite side to the intermediate point P1 of the first heating coil 31 and P3 indicates an end portion (connection point with the second node N2) of an opposite side to the intermediate point P1 of the second heating coil 32.

FIGS. 1 to 3 illustrate an example in which the heating coil 3 is wound in a spiral manner, but a method of winding of the heating coil is not limited thereto. For example, a coil, in which a wire having the same diameter is wound to be stacked more two layers, may be used as the heating coil 3. In the case of the coil having two or more layers, the heating coil 3 may be divided into the first heating coil 31 and the second heating coil 32 for every layer.

Figure 4:
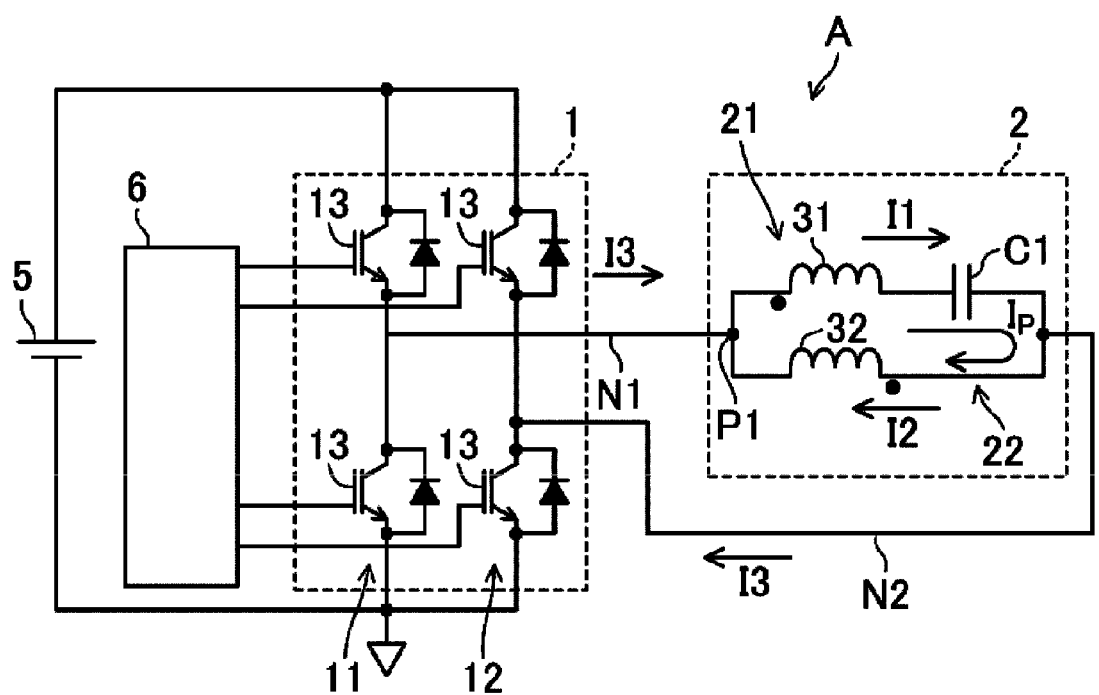
FIG. 4 illustrates an equivalent circuit of the resonant circuit of FIG. 1.

FIG. 4 is an equivalent circuit of the resonant circuit 2 of FIG. 1. As illustrated in FIGS. 2 to 4, the resonant circuit 2 is provided between the first node N1 and the second node N2. The resonant circuit 2 includes the above-described first heating coil 31, second heating coil and first capacitor C1. The first heating coil 31 and the first capacitor C1 are connected in series between the first node N1 and the second node N2, thereby forming a first resonant circuit 21 (refer to FIG. 4). In addition, the second heating coil 32 is connected in parallel to the first resonant circuit 21. In other words, the first heating coil 31, the first capacitor C1, and the second heating coil 32 are connected in series to form a closed loop circuit 22 (refer to FIG. 4).

In FIGS. 2 and 4, a direction of the current is shown by an arrow. By the configuration according to an embodiment, a loop current Ip (refer to FIG. 4) flows through the closed loop circuit 22. Accordingly, as illustrated in FIG. 2, a magnetic flux direction, which is generated by the current which flowing through the first heating coil 31 (hereinafter referred to as a first current I1), and a magnetic flux direction, which is generated by the current which flowing through the second heating coil 32 (hereinafter referred to as a second current I2) become the same. Therefore, the magnetic flux generated in the first heating coil 31 is compensated by the magnetic flux generated in the second heating coil 32, thereby preventing the reduction of the heating efficiency. Hereinafter a current flowing through the first node N1 and the second node N2 is referred to as a third current I3.

The controller 6 comprises hardware, such as CPU and a memory, and software, such as a control program. The controller 6 comprehensively controls the operation of the induction heating apparatus A. Particularly, the controller 6 may be provided with at least one processor, and may perform the following operation of the induction heating apparatus A using data or algorithms stored in a memory. At least one processor and memory may be implemented as separate chips, but may also be implemented as a single chip.

The controller 6 provided with at least one processor controls a frequency F of a current flowing through the heating coil 3 (the first heating coil 31 and the second heating coil 32) by controlling the switching operation of the switching element 13 of the inverter 1.

It will be described below.

An equation 1 below is an equation for an impedance Z1 of the first resonant circuit 21 and an equation 2 below is an equation for an impedance Z2 of the second heating coil 32.

$$Z1 = \frac{j(1 - w^2 \times L1 \times C1)}{w \times C1} \qquad \text{Equation 1}$$

$$Z2 = j \times w \times L2 \qquad \text{Equation 2}$$

In the equations 1 and 2, ω is an angular frequency of the current flowing through the heating coil 3, C1 is a capacitance value of the first capacitor C1, L1 is an inductance value of the first heating coil 31, and L2 is an inductance value of the second heating coil 32.

The controller 6 controls the switching element 13 so that an absolute value |Z1| of the impedance Z1 of the first resonant circuit 21 and an absolute value |Z2| of the impedance Z2 of the second heating coil 32 are equal to each other.

"The impedances Z1 and Z2 have the same absolute value" includes a concept in which two absolute values are the same and a concept in which one absolute value is placed in a substantially same range (range of neighboring values) of the other absolute value. That is, "The controller 6 controls the switching element 13 so that an absolute value |Z1| of the impedance Z1 of the first resonant circuit 21 and an absolute value |Z2| of the impedance Z2 of the second heating coil 32 are equal to each other" includes a concept in which the controller 6 controls the switching element 13 so that the absolute value |Z1| of the impedance Z1 of the first resonant circuit 21 is equal to the absolute value |Z2| of the impedance Z2 of the second heating coil 32, and a concept in which the controller 6 controls the switching element 13 so that two absolute values are in a predetermined range (e.g., a difference between two absolute values is 30% or less) that is assumed that two absolute values are sufficiently the same. This will be applied to a second embodiment described later and thus "an absolute value of impedances Z1 and Z3 are the same" includes a concept in which two absolute values are the same and a concept in which one absolute value is placed in a substantially same range (range of neighboring values) of the other absolute value.

Figure 5:
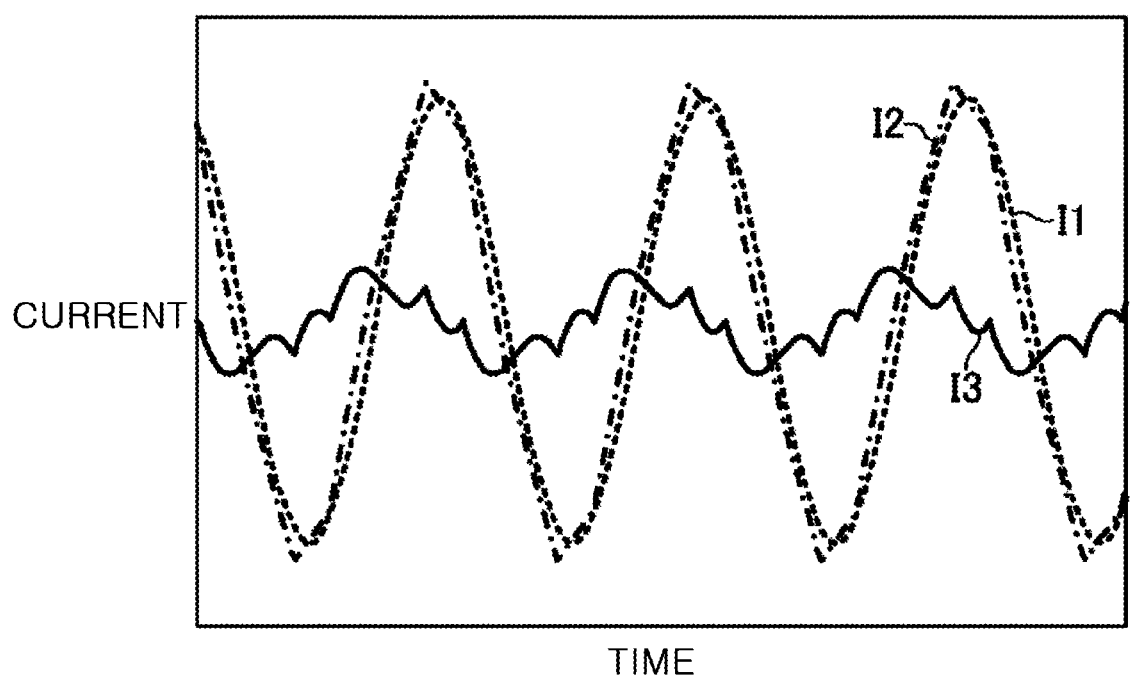
FIG. 5 is a graph illustrating an example of a waveform and a phase of each current in the circuit of FIG. 4.

FIG. 5 illustrates examples of waveforms of the first current I1 (dotted line), the second current I2 (dot-dash line), and the third current I3 (solid line) when the control according to an embodiment is performed. The first current I1 and the second current I2 are currents of substantially the same phase in the current directions of I1 and I2 in FIG. 5. As illustrated in FIG. 5, even when a relatively large loop current Ip flows through the closed loop circuit 22, it is possible to reduce the third current I3 corresponding to a current flowing through the inverter 1.

Using the equations 1 and 2, a frequency Fo in which the absolute value |Z1| of the impedance Z1 is equal to the absolute value |Z2| of the impedance Z2 may be represented as equation 3 below $$F0 = \frac{1}{2\pi\sqrt{C1 \times S(L1 + L2)}}$$ Equation 3

Figure 6:
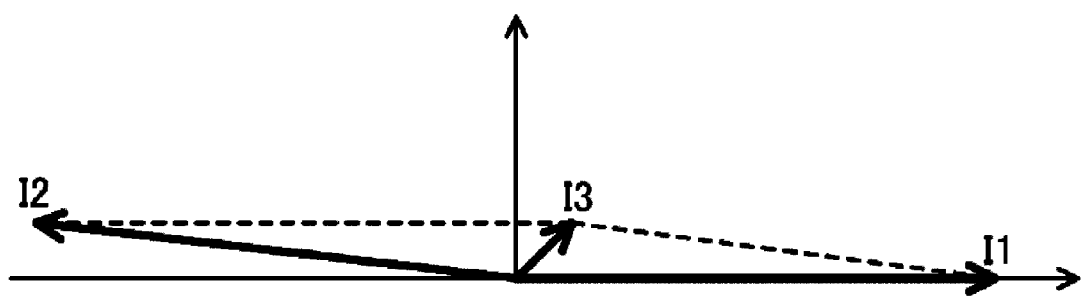
FIG. 6 is a graph illustrating a phase vector of each current in the circuit of FIG. 3.

FIG. 6 illustrates phase vectors of the currents I1 to I3 when the control according to an embodiment is performed. As illustrated in FIG. 6, by performing the control according to an embodiment, the phase vector of the first current I1 and the phase vector of the second current I2 are in a phase relationship in substantially opposite directions. In FIG. 6, it can be seen that it is possible to make the value of the third current I3, which is the combined current of the first current I1 and the second current I2, small. That is, it is possible to flow a relatively large current through the closed loop circuit 22 while maintaining a current flowing through the first node N1 to be a relatively small value. That is, it is possible to operate the induction heating apparatus A with high efficiency.

Figure 7:
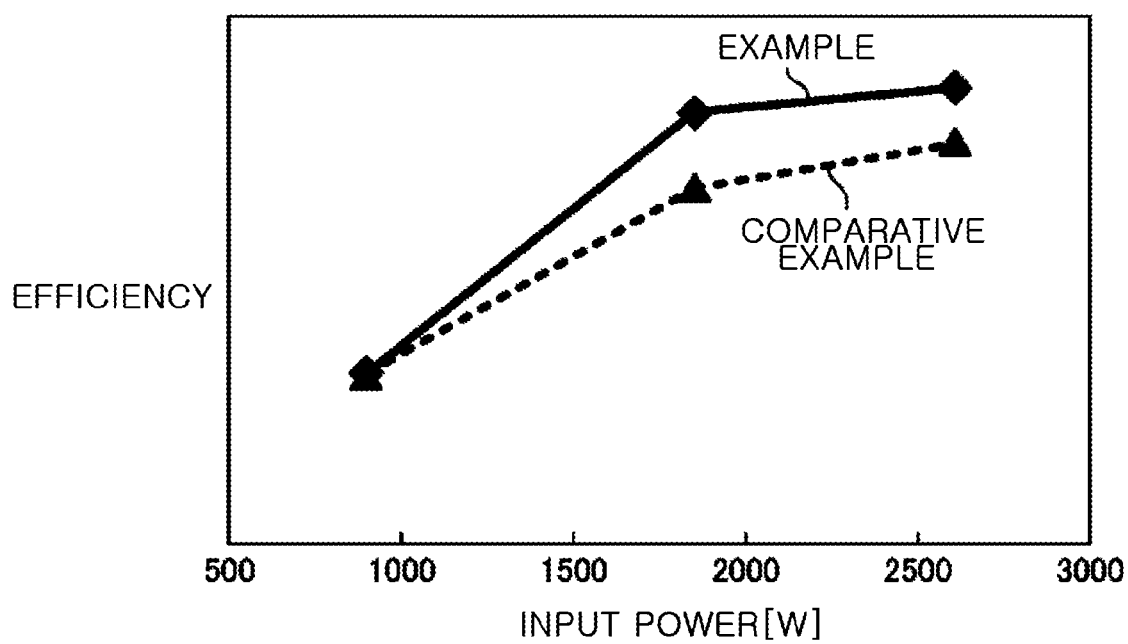
FIG. 7 is a graph illustrating a result of comparing heating efficiency of the embodiment with heating efficiency of the conventional technique.

FIG. 7 illustrates that an efficiency comparison result (experimental data) of the induction heating apparatus A (described as "example" in FIG. 7) of the embodiment, and a conventional induction heating apparatus as disclosed in Patent Document 1 (described as "comparative example" in FIG. 7). As illustrated in FIG. 7, by the configuration according to the embodiment, it is possible to implement the induction heating apparatus with high efficiency in comparison with the conventional technique.

As described above, according to an embodiment, the resonant circuit 2 is configured by the first heating coil 31 and the second heating coil 32, which are obtained by dividing the heating coil 3, and the first capacitor C1. That is, the inductance element constituting the resonant circuit 2 is used for both of the first heating coil 31 and the second heating coil 32 obtained by dividing the heating coil 3. Therefore, the number of the components of the circuit and the circuit loss may be reduced in comparison with the conventional configuration. For example, in the configuration of patent document 1, two capacitors are used at positions corresponding to the closed loop circuit 22 of the embodiment, and thus the loss occurs in each of them.

However, using the configuration according to the embodiment, the loss may be significantly reduced. Further, because the number of capacitor is reduced, it is possible to implement the miniaturization while reducing the cost. Particularly, because a relatively large current flows in the closed loop circuit 22, a more remarkable effect may be obtained.

Further, in the embodiment, the controller 6 controls the switching element 13 of the inverter 1 so that the absolute value |Z1| of the impedance Z1 of the first resonant circuit 21 is equal to the absolute value |Z2| of the impedance Z2 of the second heating coil 32. Therefore, it is possible to make the current flowing through the first node N1 or the second node N2 small. That is, it is possible to make the current flowing through the inverter 1 small. Further, because the number of the components, which is to be considered in the control, is small according to the embodiment, the control for maximizing the heating efficiency becomes easy.

Particularly, in the configuration according to the embodiment, it is possible to minimize the third current I3 flowing through the first node by controlling the first current I1 flowing through the first heating coil 31 and the second current I2 flowing through the second heating coil 32 to have the same degree (substantially the same). That is, a good result may be obtained by considering the first capacitor C1 in the heat generation of the component. On the other hand, in the conventional manner (for example, patent document 1), it is required to consider three components including a resonant choke coil provided in a node corresponding to the first node N1, and two resonant capacitors provided in a position corresponding to the closed loop circuit 22. Particularly, in patent document 1, for example, it is appropriate to match the current flowing through the two capacitors to minimize the current flowing through the resonant choke coil. However, when relatively large heat generation occurs in the resonant capacitor connected in parallel with the heating coil, it is required to reduce the current of the resonant capacitor, and thus the current of the resonant choke coil increases. Therefore, it is very difficult to balance the circuit in the conventional configuration but it is not required in the configuration of the embodiment.

Figure 8:
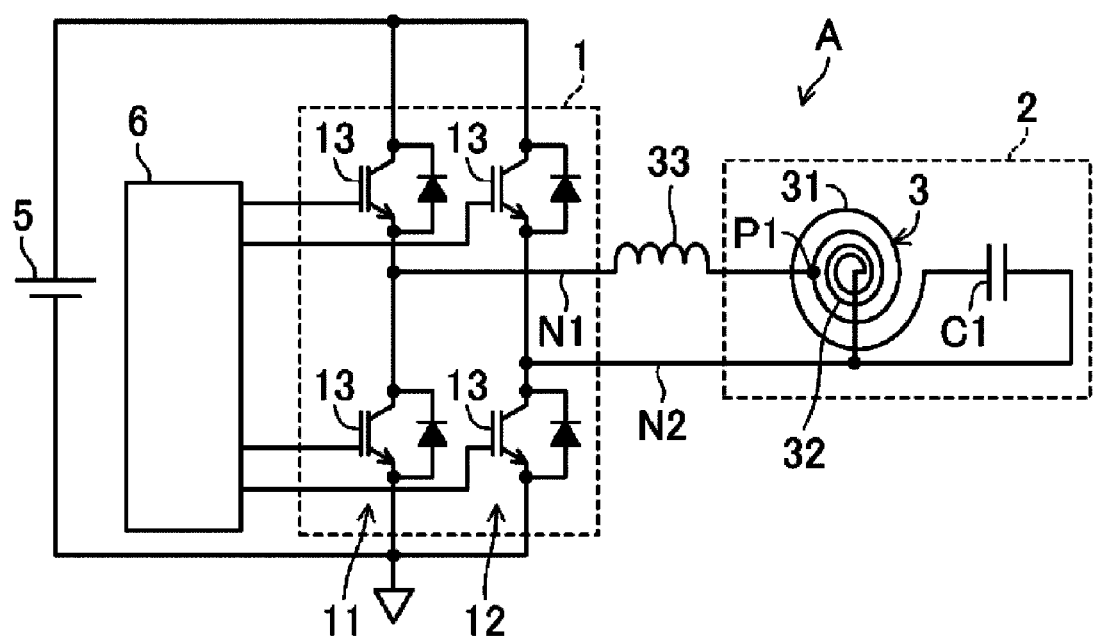
FIG. 8 is a circuit diagram illustrating another example of the configuration of the induction heating apparatus according to the first embodiment of the disclosure.

In addition, in the above embodiment, as illustrated in FIG. 8, a choke coil 33 may be arranged at the first node N1. Even in this case, the same effects may be obtained by the same control as in the above embodiment. Furthermore, by arranging the choke coils 33 at the first node N1, the current of each switching element 13 may be reduced at light load, and thus a more efficient effect may be expected. Although not shown, a capacitor may be arranged in the first node N1.

Figure 9:
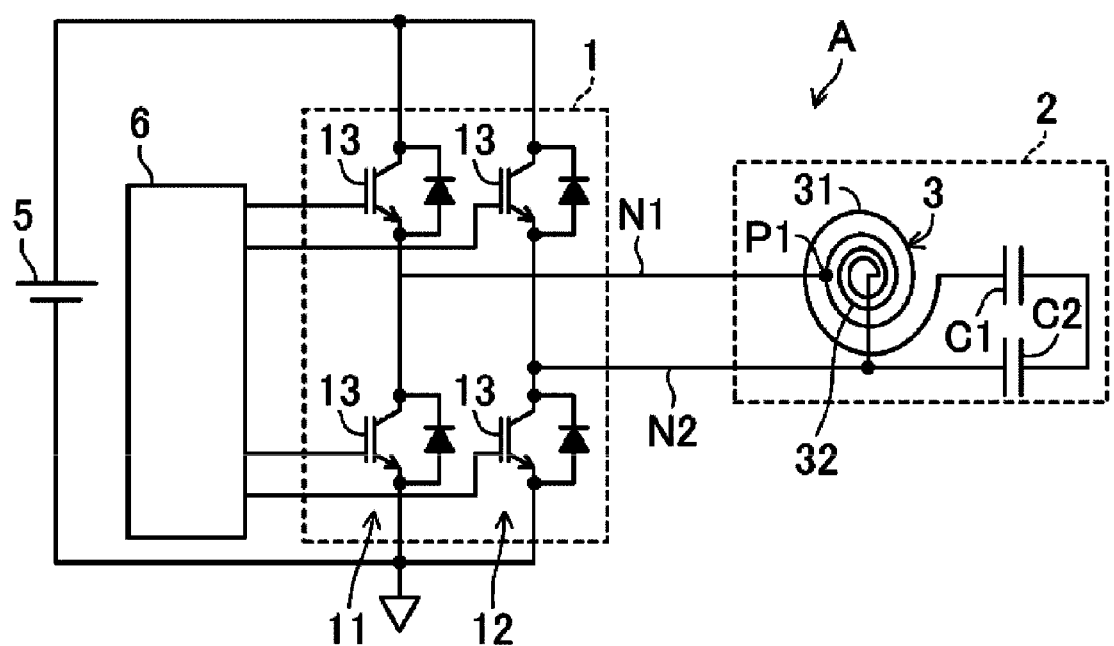
FIG. 9 is a circuit diagram illustrating an example of a configuration of an induction heating apparatus according to a second embodiment of the disclosure.
Figure 10:
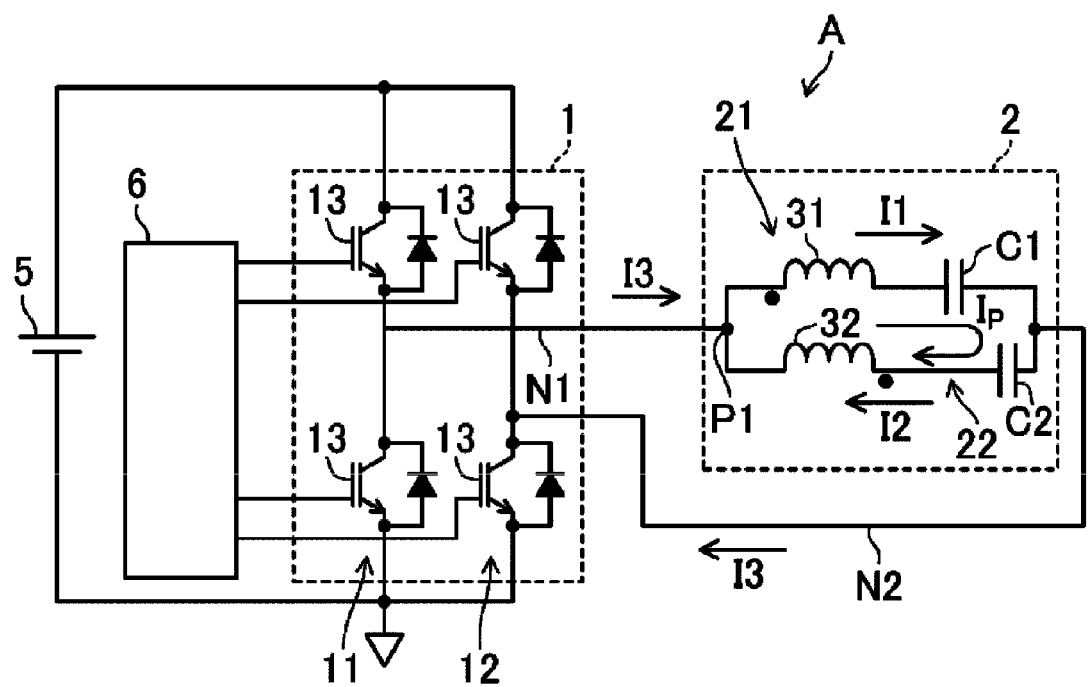
FIG. 10 illustrates an equivalent circuit of the resonant circuit of FIG. 9.

FIG. 9 is a circuit diagram illustrating an example of a configuration of an induction heating apparatus according to a second embodiment of the disclosure, and FIG. 10 is an equivalent circuit of the resonant circuit 2 of FIG. 9. In FIGS. 9 and 10, components common to FIG. 1 may have the same symbol as FIG. 1 and a description of the common component may be omitted.

In FIG. 9, the structure of the resonant circuit 2 is different from the structure of FIG. 1. Particularly, in the resonant circuit 2 according to the second embodiment, the first resonant circuit 21 common to FIG. 1 and a second resonant circuit 23 are connected in parallel. The second resonant circuit 23 is a series circuit of the above-described second heating coil 32 and the second capacitor C2. In other words, the closed loop circuit 22 (refer to FIG. 10) is formed by the first heating coil 31, the first capacitor C1, the second capacitor C2, and the second heating coil 32.

In the same manner as an embodiment disclosed herein, because the loop current Ip (refer to FIGS. 10 and 2) flows in the closed loop circuit 22, a magnetic flux direction, which is generated by the first current I1 flowing through the first heating coil 31 and a magnetic flux direction, which is generated by the second current I2 flowing through the second heating coil 32 become the same. Therefore, the magnetic flux generated in the first heating coil 31 is compensated by the magnetic flux generated in the second heating coil 32, thereby preventing the reduction of the heating efficiency.

Next, the control of the switching operation of the switching element 13 of the inverter 1 by the controller 6 will be described.

The equation of the impedance Z1 of the first resonant circuit 21 is the same as that of equation 1 described above. An equation 4 below is an equation of impedance Z3 of the second resonant circuit 23.

$$Z3 = \frac{J(1 - w^2 \times L2 \times C2)}{w \times C2} \quad \text{Equation 4}$$

In the equation 4, ω is an angular frequency of the current flowing through the heating coil 3, L2 is an inductance value of the second heating coil 32, and C2 is a capacitance value of the second capacitor C2.

Accordingly, the controller 6 controls the switching element 13 so that an absolute value |Z1| of the impedance Z1 of the first resonant circuit 21 and an absolute value |Z3| of the impedance Z3 of the second resonant circuit 23 are equal to each other.

An upper drawing of FIG. 9 illustrates the frequency characteristics of the first current I1 (dotted line), the second current I2 (dot-dash line), and the third current I3 (solid line) when the control according to an embodiment is performed. A lower drawing of FIG. 9 illustrates a phase of the first to third current I1 to I3 when the control according to an embodiment is performed. FIG. 12 illustrates a comparative example and particularly an example of the frequency characteristics of amplitude and phase when the induction heating apparatus, which has the configuration equivalent to patent document 2, is operated with the frequency corresponding to FIG. 11.

Figure 11:
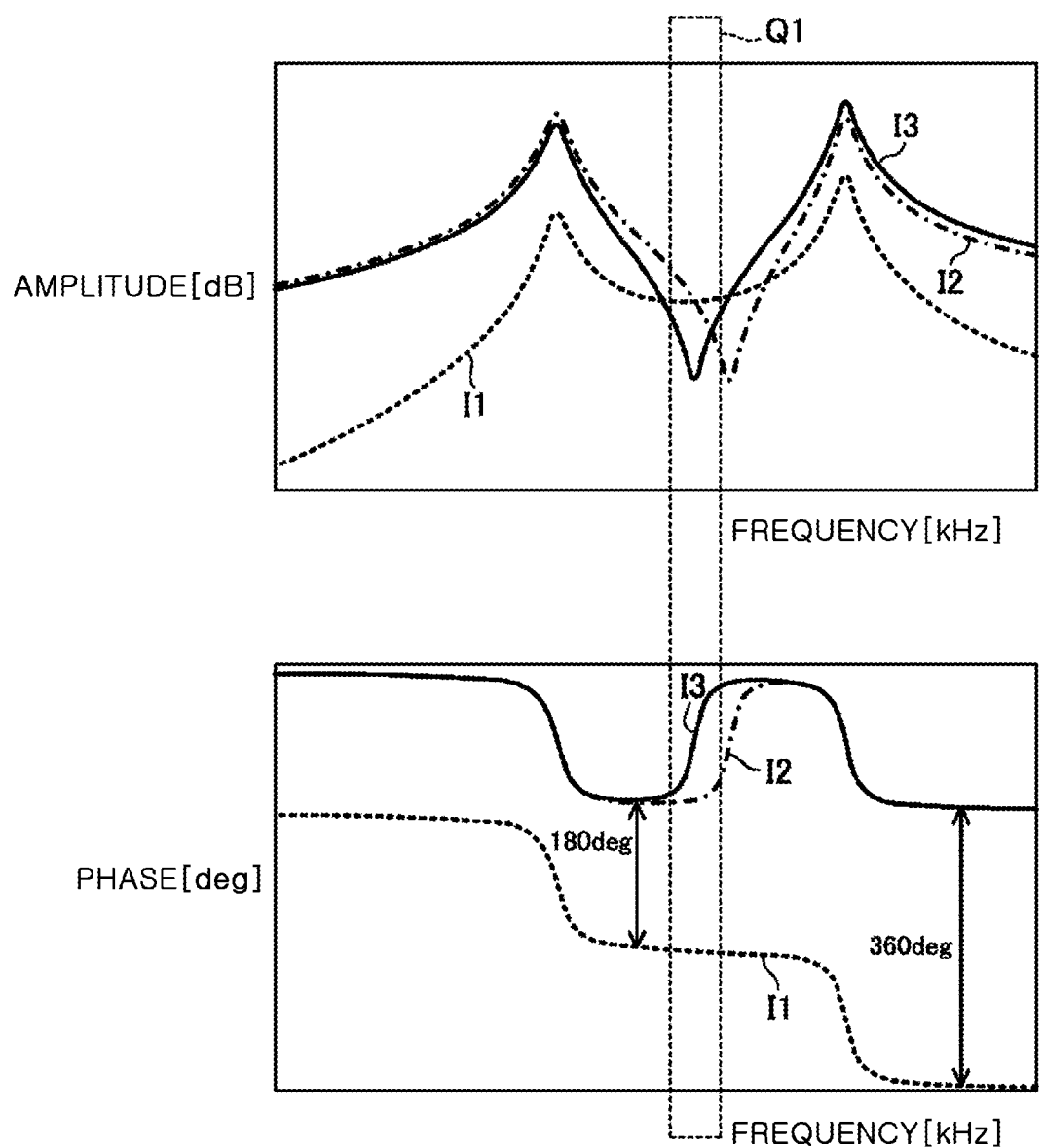
FIG. 11 is a graph illustrating an example of frequency characteristics of each current and a phase in the circuit of FIG. 9.
Figure 12:
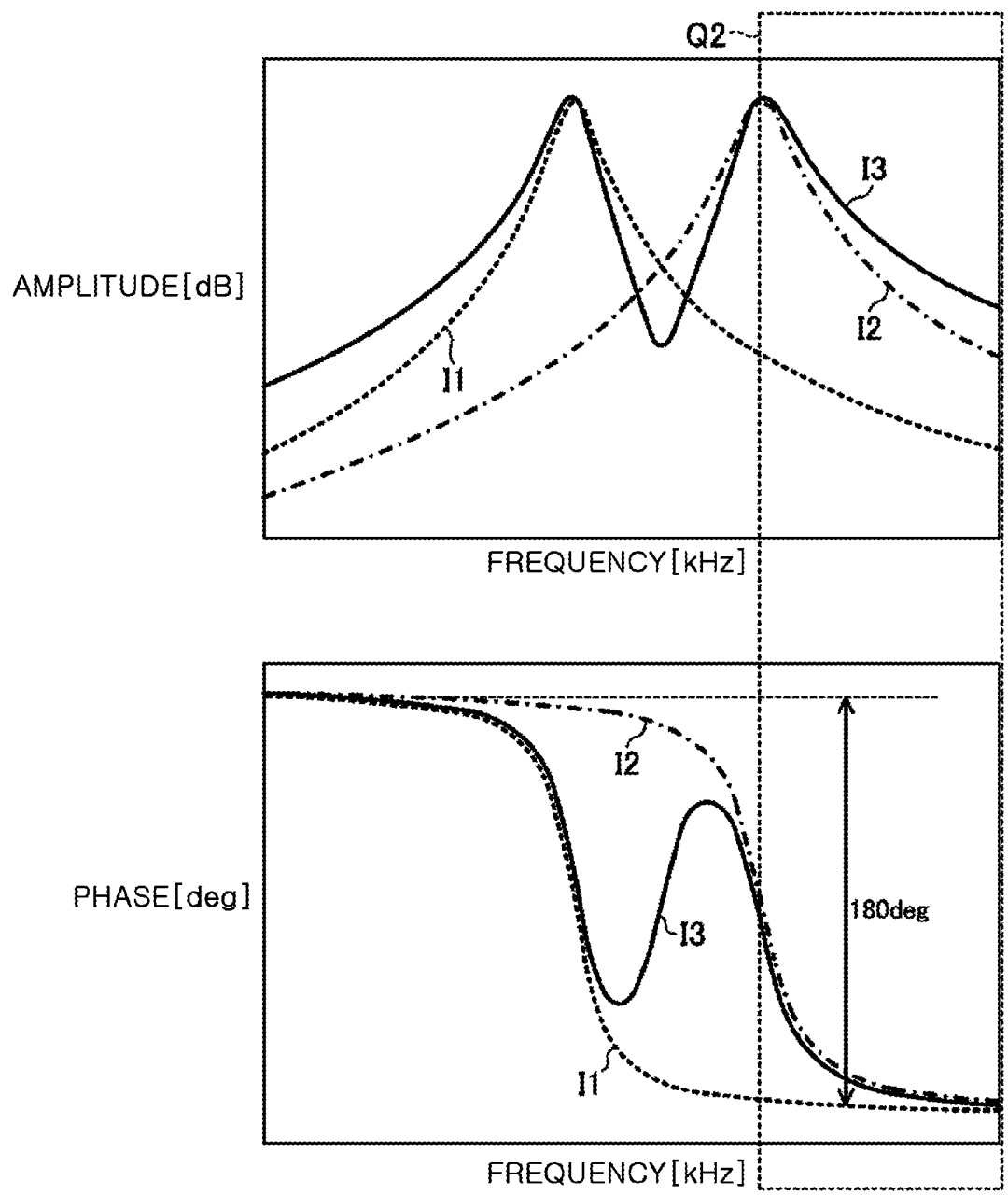
FIG. 12 a graph illustrating an example of frequency characteristics of each current and a phase, which corresponds to FIG. 10, in the conventional technique.

In FIG. 11, a frequency range, which occurs when the controller 6 controls the absolute value |Z1| of the impedance Z1 and the absolute value |Z3| of the impedance Z3 to be the same, is shown by a dotted rectangular region Q1. As illustrated in FIG. 11, even when the relatively large first current I1 and second current I2 flow through the resonant circuit 2, it is possible to make the third current I3 flowing through the inverter 1 small.

Using the equations 1 and 4, a frequency Fo in which the absolute value |Z1| of the impedance Z1 is equal to the absolute value |Z3| of the impedance Z3 may be represented as an equation 5 below $$F0 = \frac{1}{2\pi\sqrt{\frac{(C1 - C2)}{C1 \times sC2 \times s(L2 - L1)}}} \quad \text{Equation 5}$$

In FIG. 12, a range of an operating frequency, which equivalent to patent document 2, is shown by a dotted-lined rectangular region Q2. As illustrated in FIG. 12, in the conventional manner, the third current I3 is greater than the first current I1 and the second current I2 in the operating frequency range. Therefore, as the first current I1 or the second current I2 increases, the third current I3 also increases. Therefore, the loss in the components such as the inverter 1 becomes large and efficiency is reduced. Further, there is a concern in that the circuit scale is increased to improve the internal voltage of the inverter or the cost is increased.

As described above, according to the second embodiment, the resonant circuit 2 is formed by the first heating coil 31 and the second heating coil 32, which are obtained by dividing the heating coil 3, and the first and second capacitors C1 and C2, which is in the same as the first embodiment. Therefore, the circuit loss may be reduced and the heating efficiency may be increased in comparison with the conventional configuration. Further, because the inductance element constituting the resonant circuit is used for both the first heating coil 31 and the second heating coil 32, which are obtained by dividing the heating coil 3, it is possible to reduce the circuit scale.

Figure 13:
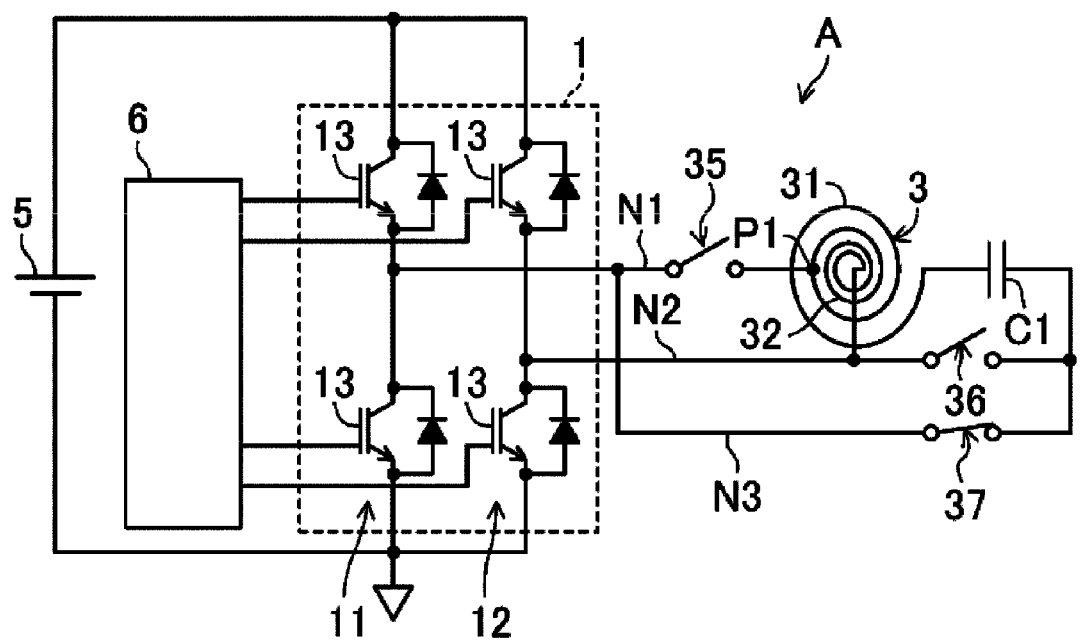
FIG. 13 is a circuit diagram illustrating an example of a configuration of an induction heating apparatus according to a third embodiment of the disclosure (in the case of a magnetic pot)
Figure 14:
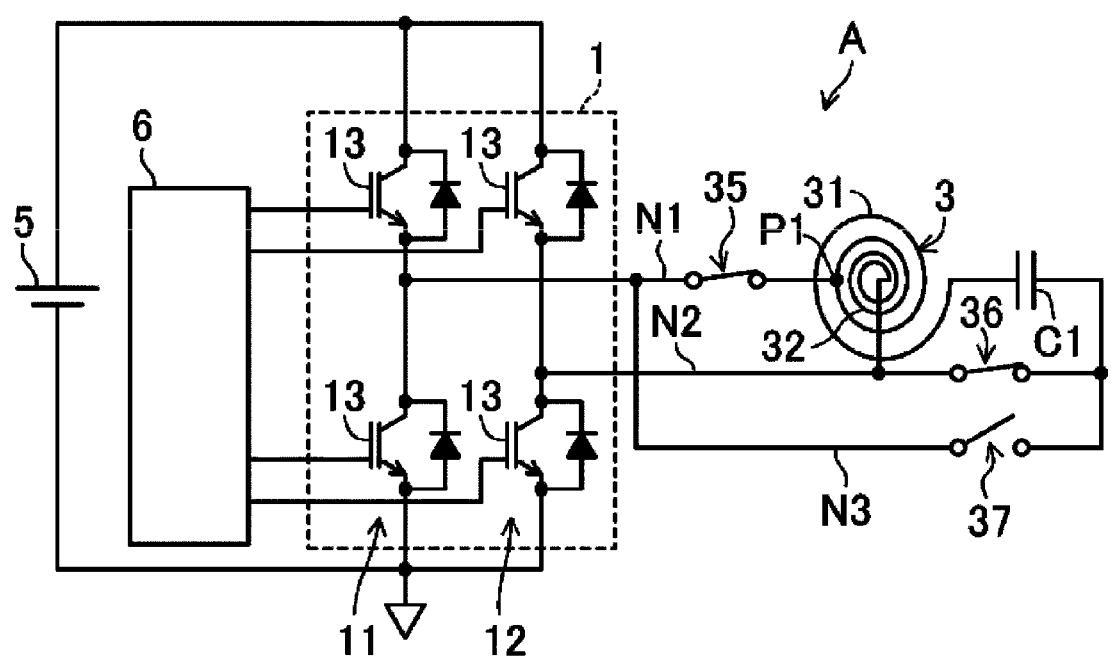
FIG. 14 is a circuit diagram illustrating an example of a configuration of the induction heating apparatus according to the third embodiment of the disclosure (in the case of a non-magnetic pot)
Figure 15:
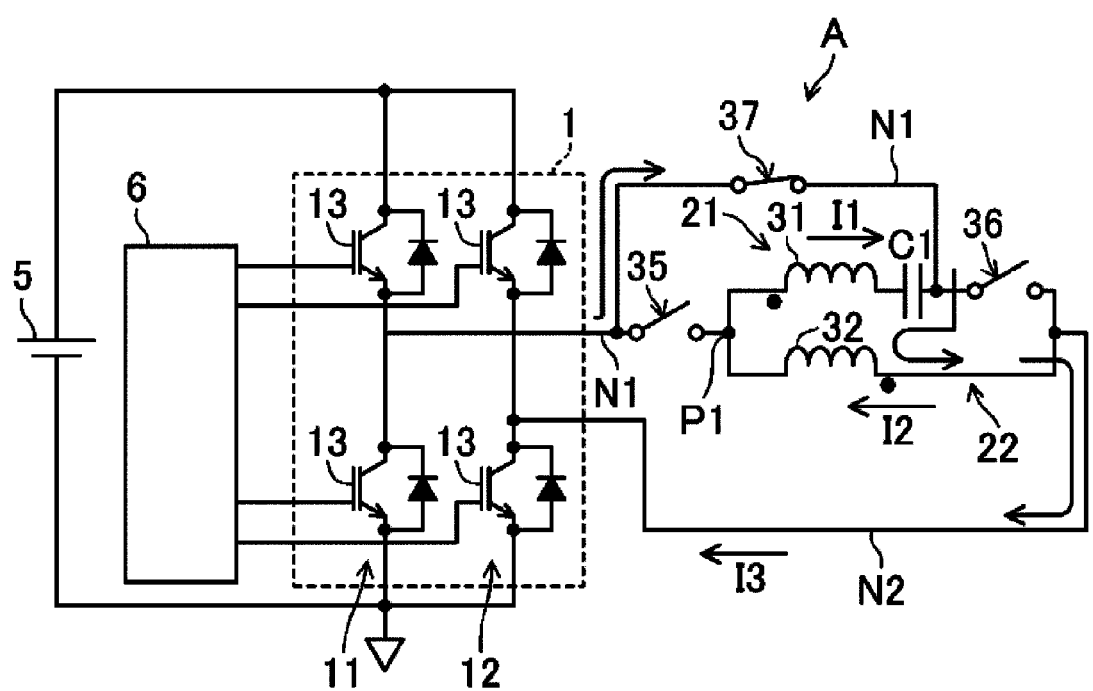
FIG. 15 is an equivalent circuit of the resonant circuit of FIG. 13.

FIGS. 13 and 14 illustrate an example of a configuration of an induction heating apparatus according to a third embodiment of the disclosure. On/off states of switches 35 to 37 described later are different from each other in FIGS. 13 and 14. FIG. 13 illustrates a switch state when a magnetic pot is detected, and FIG. 14 illustrates a switch state when a nonmagnetic pot is detected. FIG. 15 illustrates an equivalent circuit of the resonant circuit of FIG. 13. In FIGS. 13 and 14, components common to FIG. 1 may have the same symbol as FIG. 1 and a description of the common component may be omitted.

In comparison with the configuration of FIG. 1, the switches 35 to 37 are added to FIGS. 13 and 14. A switch 35 is provided at a first node N1. A switch 36 is provided between a second node N2 and a first capacitor C1. A switch 37 is provided in a third node N3 connecting a node connecting the inverter 1 to the switch 35, to a node connecting the first capacitor C1 to the switch 36. Each switch 35 to 37 is configured to switch a connection and a disconnection of a line under the control of the controller 6. Hereinafter for convenience of description, it is assumed that the lines are connected when the switches 35 to 37 are turned on and the lines are disconnected when the switches 35 to 37 are turned off.

As illustrated in FIGS. 13 and 15, when the switches 35 and 36 are turned off and the switch 37 is turned on, the circuit operates as a series resonant circuit. On the other hand, as illustrated in FIG. 14, when the switches 35 and 36 are turned on and the switch 37 is turned off, the circuit operates as a parallel resonance circuit. The configuration of the parallel resonant circuit is substantially the same as that of FIG. 1. In the following description, the circuit state illustrated in FIG. 13 may be simply referred to as "makes it a serial resonant circuit". Similarly, the circuit state illustrated in FIG. 14 may be simply referred to as "makes it a parallel resonant circuit".

In addition, in the embodiment, the controller 6 is configured to identify the type (for example, material) of an object to heated that is placed on the heating coil 3, and configured to control the connection and disconnection of the switches 35 to 37 according to the type (for example, material) of the object. For example, when the object to be heated is a pot, the controller 6 identifies whether a pot is a pot (hereinafter referred to as a nonmagnetic pot) formed of a nonmagnetic material (for example, an aluminum based material and a copper based material) or a pot (hereinafter referred to as a magnetic pot) formed of a magnetic material (for example, a SUS based material) and then the controller 6 controls connection and disconnection of the switches 35 to 37.

It will be described below.

First, the controller 6 makes the resonant circuit 2 the series resonant circuit, and identifies whether or not a pot has characteristic, which has a current peak, by changing an operating frequency of the inverter. In other words, the controller 6 identifies the type of pot by measuring a current value at a resonance frequency.

Figure 16:
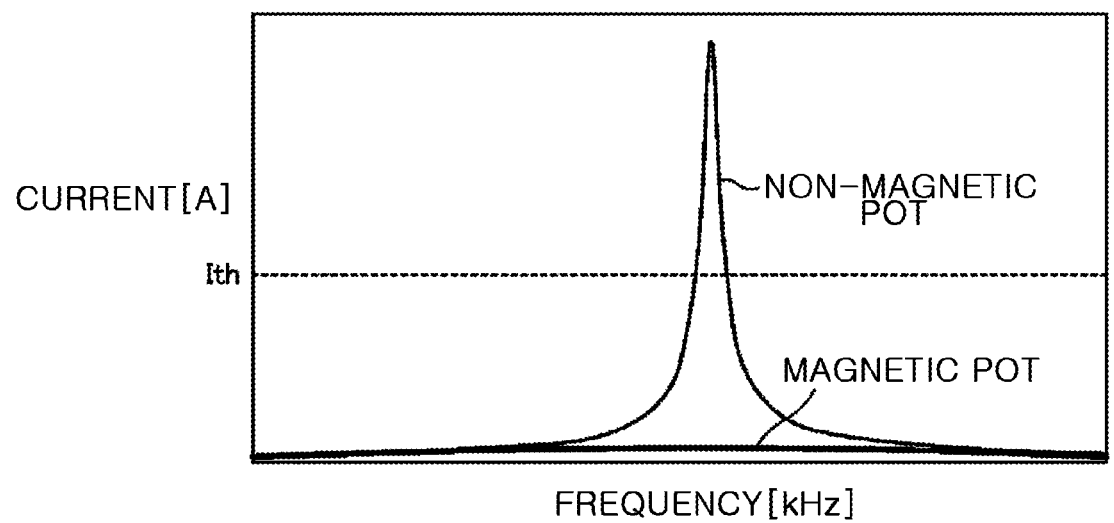
FIG. 16 is a graph illustrating frequency—current characteristics of the induction heating apparatus.

Because the nonmagnetic pot has a small impedance, the current value (peak current value) at the resonance point becomes very large, as illustrated by a thin solid line in FIG. 16. On the other hand, because the magnetic pot has a large impedance, the current value at the resonance point is small. Accordingly, the controller 6 measures the current flowing through the heating coil by changing the frequency of the inverter 1, and identifies the type of pot and its resonance frequency according to whether or not the current exceeds a predetermined threshold value Ith.

The controller 6 may identify the type of pot even in the parallel resonant circuit. Because the frequency characteristic of the nonmagnetic pot in the parallel resonant circuit is as illustrated in FIG. 11, the controller 6 searches for a frequency in which the inverter current becomes the smallest as illustrated in the region Q1 of FIG. 11 and the corresponding frequency becomes the resonance frequency. On the other hand, because the magnetic pot has a large impedance, the current of the heating coil at the resonance frequency is small. Accordingly, the controller 6 may identify the type of the pot. However, In terms of minimizing the current flowing through the switching element of the inverter 1 upon changing the operating frequency of the inverter 1, it is appropriate that the type of the pot is identified in the series resonant circuit.

Next, the controller 6 controls the switches 35-37 according to the type of pot.

Particularly, the controller 6 makes the resonant circuit 2 the series resonant circuit when the object to be heated is the magnetic pot. Because the control method of the series resonant circuit is a conventional technology, a description thereof will be omitted.

On the other hand, the controller 6 makes the resonant circuit 2 the parallel resonant circuit, when the object to be heated is the nonmagnetic pot. Therefore, the controller 6 performs the control to maximize the loop current Ip while minimizing the third current I3 in terms of operating at maximum efficiency. For example, the control will be performed as in the following control methods 1 to 3.
1. While changing the operating frequency of the inverter 1, the controller 6 performs proportional integral (PI) calculation processing so as to minimize the current of the third current I3 that is to operate the resonant circuit 2 as the resonance frequency. Particularly, the controller 6 controls the inverter 1 so that the inverter 1 increase an output thereof at a frequency in which the third current I3 becomes the smallest. For example, in FIG. 14, the controller 6 controls a voltage effective value of the first node N1 with respect to the second node N2 to be increased.
2. The controller 6 obtains the first current I1 and the second current I2, and by using PI calculation processing, the controller 6 controls the operating frequency of the inverter 1 so that a deviation of the effective value of each current value is less than or equal to 30%.
3. The controller 6 calculates an impedance of an output circuit of the inverter 1 with respect to the operating frequency of the inverter 1 in advance. According to the output of the inverter 1, the controller 6 changes the operating frequency of the inverter 1 so that the current of the first to third current I1 to L3 is within a predetermined range.

As described above, according to an embodiment, the circuit loss may be reduced and the heating efficiency may be increased in comparison with the conventional configuration. In addition, because the series resonant circuit and the parallel resonant circuit are selectively used according to the type of the object to be heated, it is possible to select the circuit method according to the type of the object to be heated and thus it is possible to employ a heating method appropriate for the type of the object to be heated.

In addition, the control methods 1 to 3 may be applied to various embodiments, and may be used in addition to or instead of the control method described in each various embodiment. In addition, the control method described in various embodiments may be applied to the operation during the parallel resonance circuit in an embodiment.

As mentioned above, the embodiments are very useful to obtain a highly practical ability to increase the heating efficiency of the induction heating apparatus using the heating coil, and the effect is high industrial applicability.

As is apparent from the above description, the induction heating apparatus provided with the heating coil may increase the heating efficiency.

Although a few embodiments of the disclosure have been shown and described, it would be appreciated by those skilled in the art that changes may be made in these embodiments without departing from the principles and spirit of the disclosure, the scope of which is defined in the claims and their equivalents.

Although the present disclosure: has been described with various embodiments, various changes and modifications may be suggested to one skilled in the art. It is intended that the present disclosure encompass such changes and modifications as fall within the scope of the appended claims.

What is claimed is:
1. An induction heating apparatus comprising:
   an inverter comprising a switching element, the inverter configured to supply a power to a first node based on an operation of the switching element;
   a first heating coil around which a wire is wound in a first winding direction with respect to the first node, the first heating coil configured to be heated by the power supplied from the first node;
   a second heating coil around which a wire is wound in a second winding direction, the second winding direction different from the first winding direction with respect to the first node, the second heating coil configured to be heated by the power supplied from the first node;
   a first switch provided between the first node and the first heating coil;
   a second switch provided between a second node and a first capacitor;
   a third switch provided between the first node and the first capacitor; and
   at least one processor configured to control a resonance frequency of a current flowing through the first heating coil and the second heating coil,
   wherein in response to determining that a material of an object to be heated is non-magnetic, the at least one processor is further configured to (i) turn on the first switch and the second switch, and (ii) turn off the third switch.

2. The induction heating apparatus of claim 1, wherein:
the first heating coil further comprises a first resonant circuit, the first resonant circuit connected with the first capacitor in series; and
the second heating coil is connected in parallel with the first resonant circuit.

3. The induction heating apparatus of claim 2, wherein the at least one processor is configured to control the inverter based on:
an absolute impedance value of the first resonant circuit; and
an absolute impedance value of the second heating coil.

4. The induction heating apparatus of claim 2, wherein the first node comprises an intermediate point, the intermediate point:
connected to one end of the first heating coil and one end of the second heating coil; or
configured to allow the first heating coil and the second heating coil to be divided from each other.

5. The induction heating apparatus of claim 4, wherein a number of windings of the first heating coil is greater than a number of windings of the second heating coil.

6. The induction heating apparatus of claim 2, wherein the at least one processor is further configured to:
turn off the first switch and the second switch; and
connect the first resonant circuit to the second heating coil in series.

7. The induction heating apparatus of claim 6, wherein the at least one processor is further configured to identify, according to the resonance frequency, a type of the object to be heated based on a value of current flowing through the first resonant circuit and the second heating coil connected in series.

8. The induction heating apparatus of claim 7, wherein the at least one processor is further configured to identify the material of the object to be heated based on the value of the current and a predetermined threshold value.

9. The induction heating apparatus of claim 7,
wherein turning off the third switch connects the first resonant circuit to the second heating coil in parallel with each other.

10. The induction heating apparatus of claim 9, wherein the at least one processor is configured to control the inverter based on:
a value of current flowing between the second node and the inverter; and
a predetermined minimum current value.

11. The induction heating apparatus of claim 9, wherein the at least one processor is further configured to change a frequency of the switch element to allow a difference between an absolute impedance value of the first resonant circuit and an absolute impedance value of the second heating coil to be included in a predetermined range.

12. The induction heating apparatus of claim 9, wherein the at least one processor is further configured to:
pre-store an impedance of an output circuit of the inverter; and
control the inverter to allow the value of the current to be included in a predetermined stored impedance.

13. The induction heating apparatus of claim 1, wherein a closed loop circuit is formed by connecting the first heating coil, the second heating coil, and the first capacitor in series with each other.

14. The induction heating apparatus of claim 1, wherein:
the first heating coil further comprises a first resonant circuit, the first resonant circuit connected with the first capacitor in series;
the second heating coil further comprises a second resonant circuit, the second resonant circuit connected with a second capacitor in series; and
the first resonant circuit and the second resonant circuit are connected in parallel with each other.

15. The induction heating apparatus of claim 14, wherein the at least one processor is configured to control the inverter based on:
an absolute impedance value of the first resonant circuit; and
an absolute impedance value of the second resonant circuit.

16. The induction heating apparatus of claim 1, wherein a magnetic flux direction generated in the first heating coil coincides with a magnetic flux direction generated in the second heating coil.

17. The induction heating apparatus of claim 1, wherein the first heating coil is arranged in a ring shape.

18. The induction heating apparatus of claim 17, wherein the second heating coil is provided on an inner side of the first heating coil.

19. The induction heating apparatus of claim 1, wherein an inductor is connected to the first node.

* * * * *